United States Patent
Kailash et al.

(10) Patent No.: US 8,024,782 B2
(45) Date of Patent: Sep. 20, 2011

(54) CUMULATIVE LOGIN CREDIT

(75) Inventors: Kailash Kailash, San Jose, CA (US); Jose Raphel, Austin, TX (US)

(73) Assignee: Zscaler, Inc., Sunnyvale, CA (US)

( * ) Notice: Subject to any disclaimer, the term of this patent is extended or adjusted under 35 U.S.C. 154(b) by 729 days.

(21) Appl. No.: 12/100,168

(22) Filed: Apr. 9, 2008

(65) Prior Publication Data
US 2009/0260065 A1   Oct. 15, 2009

(51) Int. Cl.
*G06F 7/04* (2006.01)
*G06F 15/16* (2006.01)
*G06F 17/30* (2006.01)
*H04L 29/06* (2006.01)
*H04L 9/32* (2006.01)

(52) U.S. Cl. ......... 726/5; 726/6; 726/7; 726/8; 709/227; 713/165; 713/166; 713/167

(58) Field of Classification Search ........................ None
See application file for complete search history.

(56) References Cited

U.S. PATENT DOCUMENTS

| | | | | |
|---|---|---|---|---|
| 2003/0149900 | A1* | 8/2003 | Glassman et al. | 713/202 |
| 2004/0111644 | A1* | 6/2004 | Saunders et al. | 713/202 |
| 2008/0046991 | A1* | 2/2008 | McCarthy et al. | 726/11 |
| 2008/0155651 | A1* | 6/2008 | Wasmund | 726/2 |
| 2009/0172788 | A1* | 7/2009 | Vedula et al. | 726/5 |

* cited by examiner

*Primary Examiner* — Shin-Hon Chen
(74) *Attorney, Agent, or Firm* — Clements Bernard PLLC; Lawrence A. Baratta, Jr.; Christopher L. Bernard

(57) ABSTRACT

Login credit is monitored over a credit time period. Continuous invalid login attempts decrease the login credit for the duration of the credit time period. Login credit accumulates with time. If the login credit is less than a credit threshold, login processing is precluded. A common invalid login notification for presentation to a user is generated if login processing is precluded or if login processing indicates that the login credentials are invalid.

20 Claims, 4 Drawing Sheets

CUMULATIVE LOGIN CREDIT

BACKGROUND

This disclosure relates to login security.

The prevalent use of on-line systems requires security measures to protect valuable information. One security measure is a user and password login in which a user provides login credentials, e.g., a user identifier, a password, and perhaps other information. Passwords, however, can be broken through brute-force attacks or modified forms of brute force attacks. The attacker forms tuples of the kind <u, p> where u∈U is the set of user names and p∈P is the set of passwords. To check whether <u, p> is valid, tuple permutations are provided by an agent, e.g., a software robot, during a brute force attack.

For a security system that is serving a large number of users, the rate of login processing is optimized by techniques such as password caches, multiple directory servers, etc. If R is the maximum achievable request rate, and N is the possible number of passwords, then the time required to break the passwords is N/R seconds or less. Assume the login processing time for one login is 1/R seconds. By increasing R, users get better login response. At the same time, the high value of R also increased the password breaking capability of the attacker.

Consider, for example, the problem of breaking a password of 5 characters over a 64 character password alphabet which gives a total password set $(64^5=(2^6)^5)$ of approximately 1 billion. Typically, $R=2^{20}$, yielding password breaking time of $2^{30}/2^{20}=2^{10}$ seconds, which is about 17 minutes.

Defenses against such attacks include periodically resetting passwords, locking out accounts after a certain number of login failures, and using longer passwords. It is not practical to reset user passwords on a frequent basis, however. Likewise, locking out passwords does not necessarily provide a robust defense. Consider, for example, a user population of one million. The probability that a 5 symbol password belongs to one of the users is $2^{20}/2^{30} \sim 1/1000$. The attacker can thus use a permuted password and test it across users without reaching the account lock limit.

Long passwords alone are likewise not an efficient protection scheme. By increasing the password length to 12 symbols $(64^{12}=2^{72})$, for example, the password breaking time increases to $2^{72}/2^{20}=2^{52}$ seconds, which is a long enough time to thwart password brute force attacks. However, remembering such long passwords is difficult for users, and enforcing this policy across many enterprises is likewise a difficult task.

SUMMARY

The subject matter described in this specification is directed to cumulative login credit based password protection scheme to defend against password breaking attacks. Credits are replenished at an interval normal to legitimate user logins, e.g., a person. An attacker e.g., a software agent, has to attempt at a much smaller interval to crack the password. This will exhaust the credit and the system unconditionally rejects login attempts. Thus, an unreliable password validator is presented to the attacker, e.g. an agent. The password validator, however, is also a fast reliable validator to the legitimate user, e.g., a person.

In general, one aspect of the subject matter described in this specification can be embodied in methods that include the actions of monitoring a credit time period for a user identifier; receiving user login credentials at a first time, the user login credentials including the user identifier; adjusting user login credit associated with the user identifier based on one or more of the user login credentials, the credit time period and the first time; determining if the user login credit is less than a credit threshold; allowing login processing of the login credentials if the user login credit is greater than a credit threshold, wherein the login processing generates a common invalid login notification for presentation to a user if a user login credential is invalid; and denying a login if the user login credit is determined to be less than the credit threshold, wherein the denial of the login also generates the common invalid login notification for presentation to the user and independent of whether the user login credentials are valid or invalid. Other implementations of this aspect include corresponding systems, apparatus, and computer program products.

In general, another aspect of the subject matter described in this specification can be embodied in methods that include the actions of monitoring a credit time period for a user identifier; receiving user login credentials at a first time, the user login credentials including the user identifier; determining if the user login credit is less than a credit threshold; allowing login processing of the login credentials if the user login credit is greater than the credit threshold; decrementing the user login credit associated with the user identifier if the user login credentials are invalid; precluding login processing if the user login credit is determined to be less than the credit threshold; and generating a common invalid login notification for presentation to a user if: the login processing is precluded and independent of whether the user login credentials are valid or invalid, or a user login credential is determined to be invalid during the login processing. Other implementations of this aspect include corresponding systems, apparatus, and computer program products.

One or more of the following advantages can be realized by implementations of the subject matter described herein. A password protection system can use convenient existing password for users, provide fast login processing, and still disallow password break-in attempts. The password protection system resists scale increases of brute force attacks. The password protection system provides a password protection scheme without reducing the processing speed of legitimate user logins, can support millions of users in the system, and has limited vulnerability to compromised (e.g., known) user names, i.e., user identifier.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
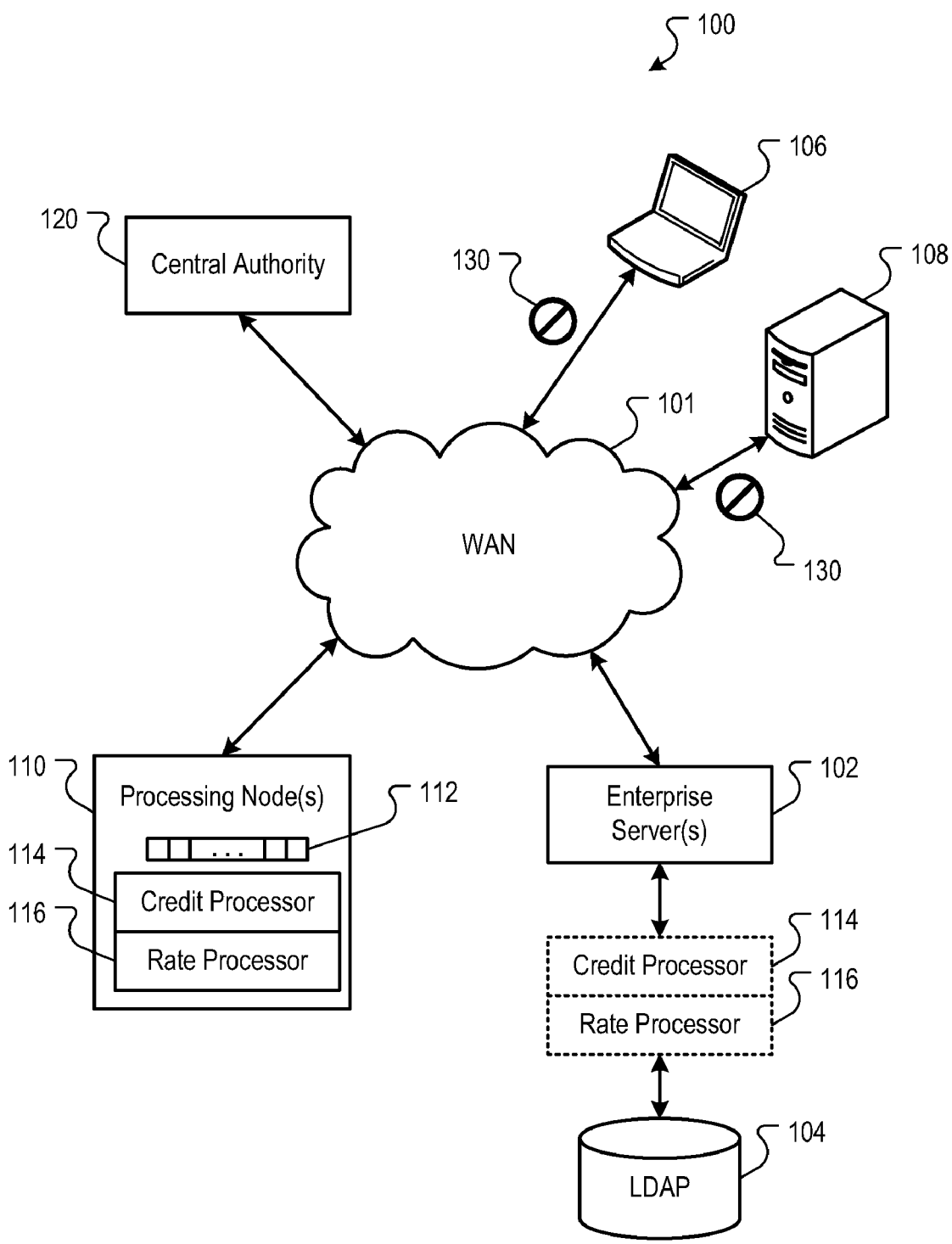
FIG. 1 is a network environment in which a cumulative login credit system is implemented.

FIG. 1 is a network environment 100 in which a cumulative login credit system is implemented. A wide area network (WAN) 101, such as the Internet, or some other combination of wired and/or wireless networks, connects in data communication an enterprise server 102, user devices 106 and 108, a processing node 110, and a central authority system 120.

The enterprise server 102 can, for example, include one or more servers associated with an enterprise, e.g., network of servers for a company. The enterprise server 102 may communicate with the WAN 101 through one or more network devices, such as a router, gateway, etc. The enterprise server 102 can access a lightweight directory access protocol (LDAP) device, such as an LDAP server, for example. The LDAP server 104 may store user login credentials, which can include a user identifiers, login passwords, and a login history associated with each user identifier.

In an implementation, security features that protect the enterprise server 102 are provided by one or more processing node(s) 110 and a central authority device 120. For example, the entity that owns the enterprise server 102, e.g., a company, may contract with a distributed security provider that provides one or more processing nodes 110 and the central authority system 120. The processing nodes 110 are devices that are used to implement security operations, such as login processing, virus scanning, traffic monitoring, etc. Example processing nodes can include server computer devices. The enterprise's security policy may be enforced and implemented through a central authority device 120. In some implementations, the central authority system 120 can include a server farm that is in data communication with the processing node(s) 110 and can provide data to the processing node(s) 110.

In one implementation, the data provided by the central authority system 120 can include a guard table 112. The guard table 112 can include a hash index of user credentials that are stored in the LDAP device 104. In response to receiving user login credentials from user devices, such as the devices 106 and 108, the presence and/or absence of the credentials in the LDAP device 104 can be quickly determined by a fast lookup in the guard table 112.

Assuming that the user device 106 is a device associated with a legitimate user, e.g., an employee of the enterprise who is not attempting to break passwords, and that the user device 108 is associated with a malicious user, e.g., a robot agent attempting a brute force attack to break the password of the user associated with the user device 106, a credit processor 114 can be used to thwart the brute force attack from the user device 108 while still facilitating login access for the user 106.

The credit processor 114 implements a security scheme based on the observation that legitimate users most often provide correct credentials and the number of times a mistake is made is small. Additionally, most legitimate users can only provide login credentials at a relatively slow rate when compared to a brute force attack, e.g., 6-10 attempts by a user per minute, as compared to potentially millions of attempts by a robot per second.

In some implementations, password security is provided, in part, by accumulating user login credit associated with each user. The user login credit can be representative of a number of times a user may attempt to login over a unit of time. Each time an invalid login attempt is received for a user identifier, the login credit for the identifier is reduced by the credit processor 114. If the user login credit is less than credit threshold, the credit processor 114 precludes login processing, regardless of the validity of the credentials.

If a login attempt is processed (e.g., login credentials are received for a user identifier having available login credit) and is determined to be an invalid attempt, the user login credit is reduced by the credit processor 114. Additionally, in some implementations, the credit processor 114 can send a common invalid login notification 130 to the user device that is providing the login credentials.

The common invalid login notification 130 can, for example, be the same notification that is provided if the user login credit is depleted. By providing a common login notification 130, the credit processor 114 prevents an attacker from determining whether the credentials provided are invalid, as the login credentials may not have been processed if the login credit has been depleted.

For example, full login credit may provide a user with five login attempts in one minute. If the user has forgotten his or her password and provides invalid credentials, the user may receive the message "Invalid login attempt. Try again," and the user's login credit is reduced. If the user provides five invalid attempts in the one minute period, and then attempts a sixth attempt in the one minute period, the user may receive the same message, i.e., "Invalid login attempt. Try again." The user, knowing the password protection policy of the enterprise, may then wait until the expiry of the credit time period, e.g., the expiry of the one minute period measured from the first login attempt, and then try to login again. Thereafter, if the user then provides valid login credentials, the user may login and the user's login credit is restored to the full value.

If, however, a robot is attempting a brute force attack, the robot may use up the user's credit within a fraction of the first second of the brute force attack. However, the robot will be unable to detect that login processing as been precluded due to lack of credit, as the robot will always receive the same "Invalid login attempt. Try again" message in response to login credentials provided when no credit is available. Thus, if the robot actually provides a valid user password on the sixth attempt, the robot will receive the common invalid login notification, and the actual valid password will be determined to be invalid by the robot. Accordingly, the brute force attack is thwarted by allowing only a very small portion of the login attempts to be processed.

In some implementations, credit processor 114 accumulates user login credit over time up to a maximum amount. In some implementations, the user login credit can be completely replenished on a periodic basis, e.g., every one minute that are independent of any user action, such as a user login attempt. Table 1 below illustrates such a credit replenishment scheme. For example, if a user has five login credits that that are fully replenished every one minute period, and provides invalid credentials at times 0 second, 13 seconds, 22 seconds, 30 seconds, and 38 seconds, then the user's login credit will be replenished at one minute, as shown in Table 1 below.

TABLE 1

Full Credit Replenishment Scheme

| Credits Available After Invalid Attempt/Replenishment | Time of Invalid Attempt (Seconds) | Time of Replenishment (Seconds) |
| --- | --- | --- |
| 4 | 0 | |
| 3 | 13 | |
| 2 | 22 | |
| 1 | 30 | |
| 0 | 38 | |
| 5 | | 60 |

In other implementations, the user login credit can be replenished over time periods referenced from invalid login attempts. For example, if a user has five login credits that can be used over a one minute period, and provides invalid credentials at times 0 second, 13 seconds, 22 seconds, 30 seconds, and 38 seconds, then the user's login credit will accumulate up to the maximum amount as shown in Table 2 below.

TABLE 2

Partial Credit Replenishment Scheme

| Credits Available After Invalid Attempt/Replenishment | Time of Invalid Attempt (Seconds) | Time of Replenishment (Seconds) |
|---|---|---|
| 4 | 0 | |
| 3 | 13 | |
| 2 | 22 | |
| 1 | 30 | |
| 0 | 38 | |
| 1 | | 60 |
| 2 | | 73 |
| 3 | | 82 |
| 4 | | 90 |
| 5 | | 98 |

Figure 3A:
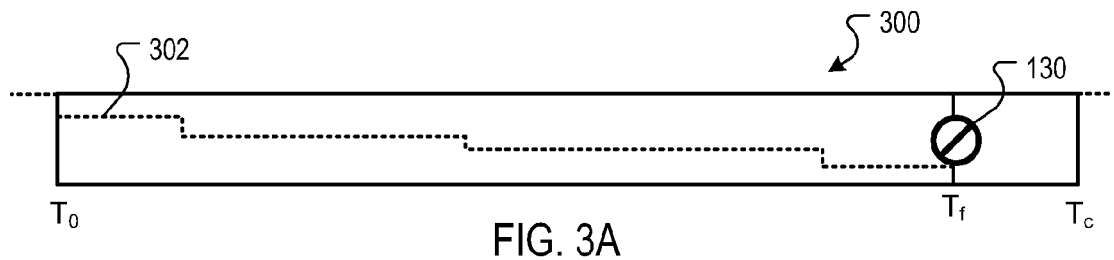
FIGS. 3A and 3B are example credit expenditure times for two different login sessions.
Figure 3B:
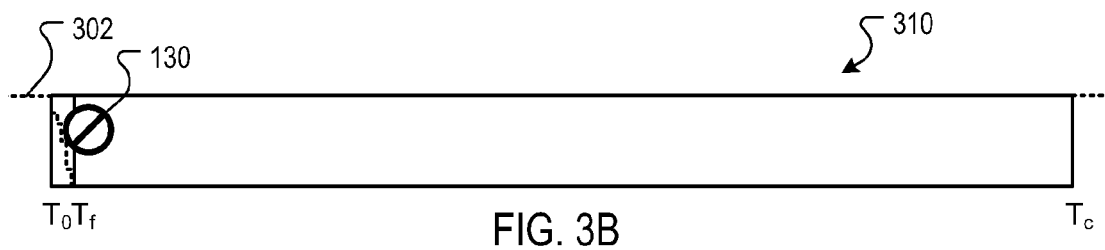
Figure 4:
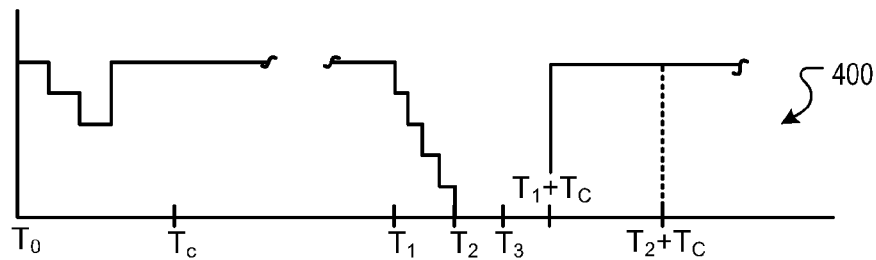
FIGS. 4-6 are example login credit accumulation process timelines.
Figure 5:
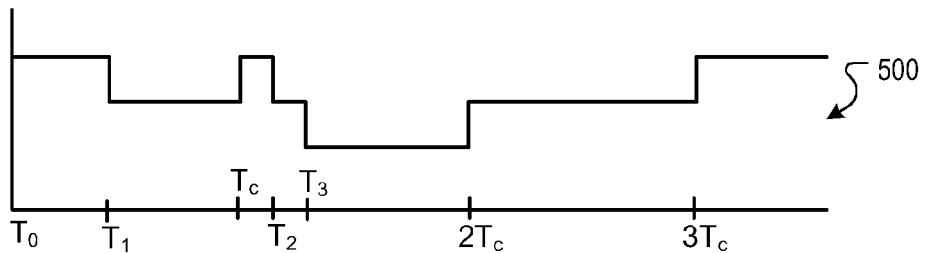

Other credit accumulation processes, such as the examples shown in FIGS. 3-5, can also be used in the credit processor 114.

In some implementations, the credit processor 114 can apportion login credit into two different portions, a reserved portion and a general portion. The login credit can have two values, e.g., <cr, cg>, that define a tuple of reserved credit and general credit. Reserved credits are used when a user attempts to log in from a first login environment, e.g., trusted sources from within the enterprise. General credit is used when the user attempts to login from second login environments, e.g., an Internet café, from home, etc. Because the attacker will typically have access only to general credit, the user can still login using reserved credit. Thus, if an attacker is attempting to discover a user's password, the depletion of the user's general credit will not impact the user's ability to login to a system if the user is attempting to login from the first login environment.

The cumulative login credit process can also be supplemented with other login protection schemes. For example, a rate processor 116 can define a login rate r in which r=<n, t, T>. The rate r defines the number of attempts n that can be made in t minutes followed by T minutes of unconditional rejection if the previous n attempts did not succeed in t time. Other password protection schemes can also be used in conjunction with the cumulative credit process.

In summary, the credit processor 114 makes the login protection system non-deterministic. For example, depending on the time of the two login requests with the same login credentials, one may be rejected; the other may be accepted, depending on the amount of available login credit associated with the login credentials. As only a common invalid login notification 130 is provided, the attacker cannot use the login system as a reliable password checker.

In some implementations, login credit can be temporarily increased beyond a normal maximum amount. For example, a user who have not logged in for a long duration might have forgotten his or her password, hence the credit processor 114 would allow more credits.

In some implementations, the credit processor 114 can apply a rate adaptation scheme by which the user's natural rate is discovered over time. The credit processor 114 can begin with a default credit value, e.g., five attempts for one minute. Based on observing the user's natural login attempts, the number of attempts and time period may be changed, e.g., to three attempts over a two minute period, for example. As more successful attempts are made, the system reduces the value of n or expands the duration t. It is based on the observation that users remember their password after a number of successive usages.

The same type of adaptation can be used for other protection schemes, e.g., the supplement rate scheme r. For example, the rate processor 116 may set predefined values of <n, t, T> on a password reset, and learn the user's natural login attempts. As more successful attempts are made, the rate processor 116 can reduce the value of n or expand the duration t.

In other implementations, the credit processor 114, and optional supplemental protection devices, e.g., the rate processor 116, can be provided within the enterprise. For example, the enterprise may provide its own security protection, and the enterprise servers 102 may implement the security protection within enterprise servers 102. Accordingly, the credit processor 114 can be implemented within the enterprise.

The credit processor 114, and optional supplemental protection devices, e.g., the rate processor 116, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The credit processor 114, and optional supplemental protection devices, e.g., the rate processor 116, can be implemented separately, or can be implemented as a single software entity. The credit processor 114, and optional supplemental protection devices, e.g., the rate processor 116, can also be distributively implemented over a network, such as a server farm, or can be implemented in a single computer device.

Figure 2A:
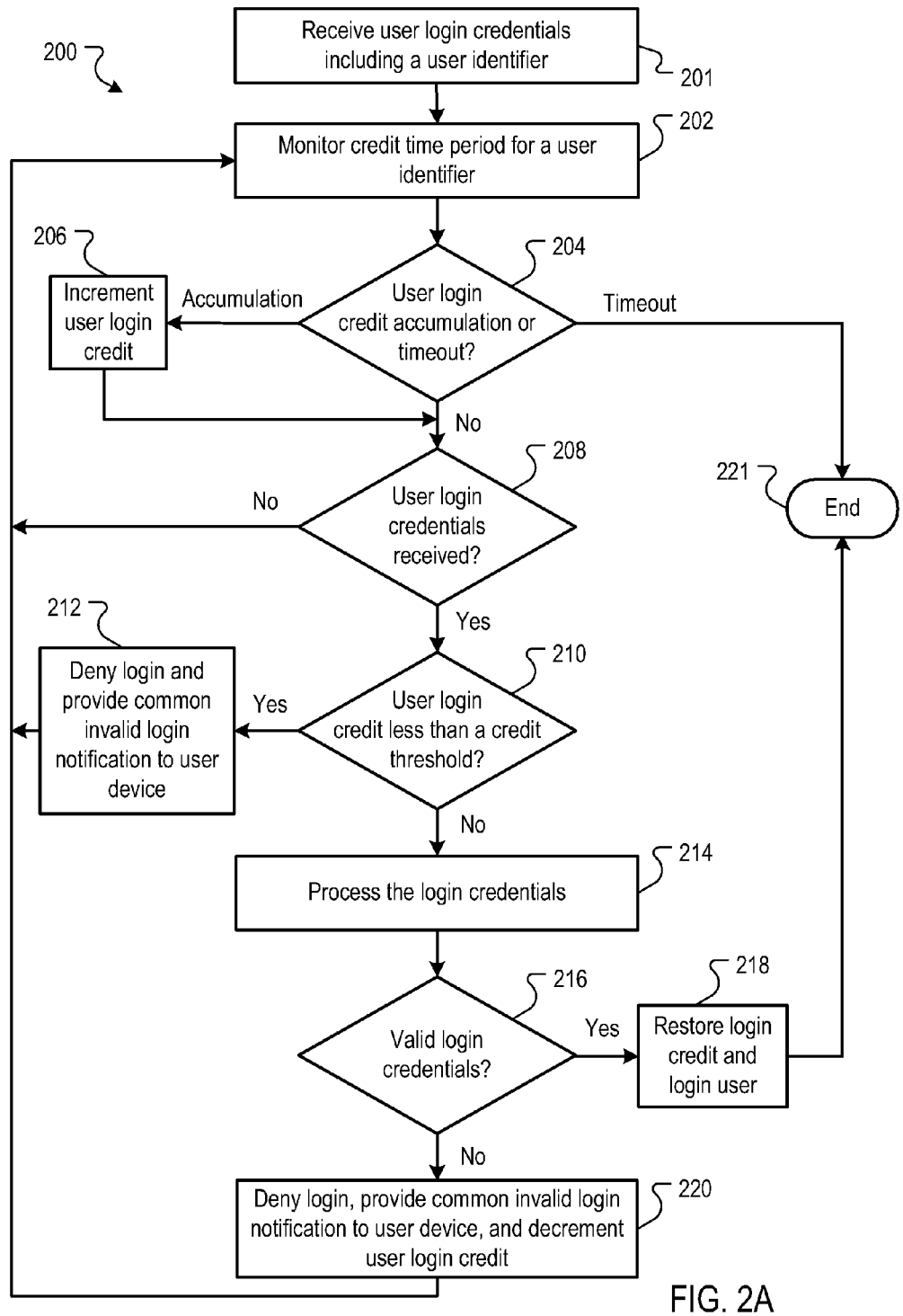
FIGS. 2A and 2B are flow diagrams of example cumulative login credit processes.

FIG. 2A is a flow diagram of an example cumulative login credit process 200. The process 200 can, for example, be implemented in the credit processor 114 of FIG. 1.

Stage 201 initiates the process receives user login credentials including a user identifier. For example, the credit processor 114 in the processing node can receive the login credentials that include the user identifier.

Stage 202 monitors a credit time period for the user identifier. For example, the credit processor 114 can monitor one minute periods associated with the user that have less than a maximum amount of login credit.

Stage 204 determines whether user login credit has accumulated, or whether the time period has timed out. For example, the credit processor 114 can determine whether user login credit associated with a user identifier should be incremented or replenished, or if login attempts for the user identifier have ceased. In some implementations, the time period will time out after credit is fully replenished.

If stage 204 determines that user login credit has accumulated, then stage 206 increments the user login credit, and the process proceeds to stage 208. For example, the credit processor 114 can entirely replenish the user login credit, or can increment the user login credit by one incremental quantum.

If stage 204 determines that a timeout has occurred, then the process ends at stage 221. For example, the credit processor 114 can determine that the user has ceased attempting to login, and will stop monitoring the credit time period for the user identifier. In some implementations, full credit is replenished on timeout. In other implementations, the timeout occurs when credit is fully accumulated and no additional user login attempts are received.

If stage 204 determines that user login credit has not accumulated or timed out, then the process proceeds to stage 208. Stage 208 determines whether user login credentials are received. For example, the credit processor 114 can determine whether the processing node 110 or the enterprise server 102 has received user login credentials for a login attempt.

If stage 208 determines that user login credentials have not been received, then the process 200 returns to stage 202. Conversely, if stage 208 determines that user login credentials have been received, then stage 210 determines whether the user login credit associated with the user login credentials (e.g., a user identifier) is less than a credit threshold. For example, the credit processor can determine whether the login credit associated with the user identifier is less than a minimum amount, e.g., 0.

If stage 210 determines that the user login credit associated with the login credentials is less than the credit threshold, then stage 212 denies the login and provides a common invalid login notification to the user device that provided the login credentials. The process then returns to stage 202. For example, the credit processor can preclude processing of the login credentials and provide the common invalid login notification of "Invalid login—try again." The process then returns to stage 202.

If, however, stage 210 determines that the user login credit is not less than a credit threshold, then stage 214 processes the login credentials. For example, the credit processor 114 can query a guard table to determine whether the login credentials are valid, or can pass the login credentials to an LDAP device 104 that processes login requests.

Stage 216 determines whether there are valid login credentials. For example, the credit processor 114 or the LDAP device 104 can return a valid login result or an invalid login result.

If stage 216 determines there are valid login credentials, then stage 218 restores login credit and the user is logged in. For example, the credit processor 114 can restore login credit associated with the user identifier if the login credit is less than a maximum amount, and the user can be logged into the enterprise server. The process then ends at stage 221.

If stage 216 determines the login credentials are not valid, then stage 220 denies the login attempt and provides the common invalid login notification to user device providing the login credentials. Additionally the user login credit associated with the user identifier is decremented by an incremental quantum. For example, the credit processor 114 can deny the login, provide the common invalid login notification to the user device providing the login credentials, and decrement the login credit associated with the user identifier. The process then returns to stage 202.

Figure 2B:
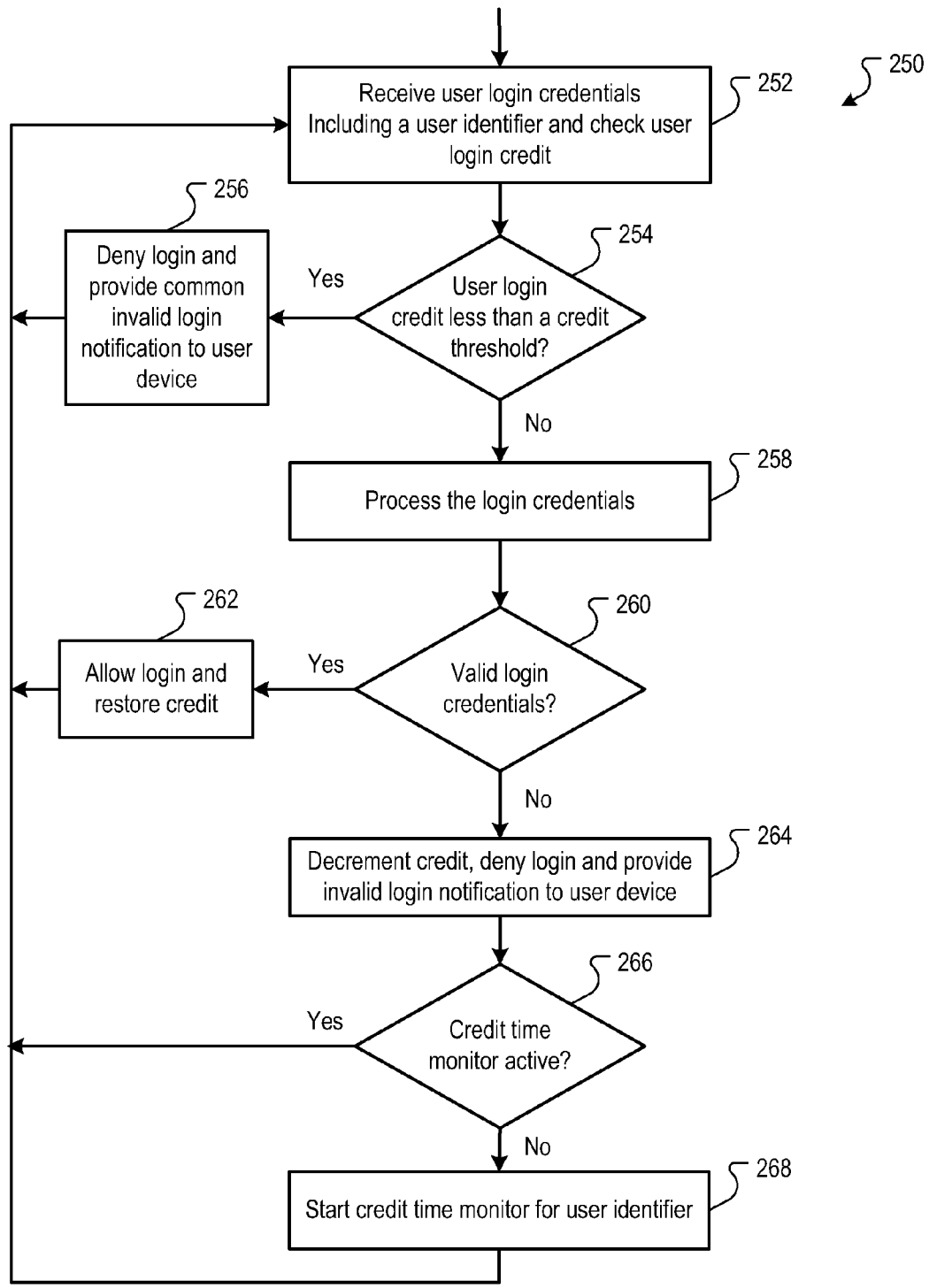

FIG. 2B is a flow diagram of an example cumulative login credit process 250. The process 250 can, for example, be implemented in the credit processor 114 of FIG. 1.

Stage 252 receives user login credentials including a user identifier and checks login credits associated with the user identifier. For example, the credit processor 114 in the processing node 110 can receive user login credentials including a user identifier and check the login credits associated with the user identifier.

Stage 254 determines whether the user login credit is less than a credit threshold. For example, the credit processor 114 can determine whether the user login credit is less than the credit threshold.

If stage 254 determines that the user login credit is less than a credit threshold, then stage 256 denies the login and provides a common invalid login notification to the user device. For example, the credit processor 114 can preclude processing of the login credentials and provide the common invalid login notification of "Invalid login—try again." The process then returns to stage 252.

If stage 254 determines that the user login credit is not less than a credit threshold, then stage 258 processes the login credentials. For example, the credit processor 114 can query a guard table to determine whether the login credentials are valid, or can pass the login credentials to an LDAP device 104 that processes login requests.

Stage 260 determines whether there are valid login credentials. For example, the credit processor 114 or the LDAP device 104 can return a valid login result or an invalid login result.

If stage 260 determines there are valid login credentials, then stage 262 allows the login and restores the login credit, and returns the process to stage 252 to await another user login. For example, the credit processor 114 can restore login credit associated with the user identifier if the login credit is less than a maximum amount, and the user can be logged into the enterprise server.

If stage 260 determines the login credentials are not valid, then stage 264 denies the login attempt, decrements the login credit associated with the user identifier and provides the common invalid login notification to user device providing the login credentials. For example, the credit processor 114 can deny the login, provide the common invalid login notification to the user device providing the login credentials, and decrement the login credit associated with the user identifier.

Stage 266 determines if a credit time monitor is active for the user identifier. For example, the credit process can determine if a credit time monitor is active for the user identifier.

If a credit time monitor is active, then the process returns to stage 252. Otherwise, stage 268 starts a credit time monitor for the user identifier and the process returns to stage 252. For example, the credit processor 114 can start a credit time processor the user identifier.

In other implementations, the cumulative credit processes can be implemented without the use of timers. For example, a passive cumulative credit monitoring can use no timers, and can compare the times at which a first login failure occurred for a user identifier to a current time when the login credit falls below the threshold. If the time at which the first login failure occurred and the current time are both within a credit time period, then credit will not be replenished. Conversely, if the time at which the first login failure occurred and the current time define a duration larger than the credit time period, then the credit can be replenished.

Although the processes 200 and 250 have been described with respect to a single login credit, the processes 200 and 250 can be applied to apportioned login credits, e.g., general credit and reserved credit. For example, the credit processor 114 can associate a first portion of the user credit with a first login environment, and associate a second portion of the user login credit with a second login environment. The second portion of the user login credit can be separate (i.e., different) from the first portion of the user login credit. Thereafter, the credit processor 114 can determine whether the login credentials are received from the first environment or the second environment, and can process the first portion of the user login credit or the second portion of the user login credit on a respective first environment basis or a second environment basis based on the determination. Accordingly, an attack that depletes a user's general login credit may not deplete a user's reserved login credit.

Although the processes 200 and 250 have been described with respect to a synchronous credit timer and monitor, such description is not limiting. The credit timers and monitors can be implemented synchronously or asynchronously of the login process.

FIGS. 3A and 3B are example credit expenditure times for two different login sessions. Both FIGS. 3A and 3B illustrate example expenditures of a login credit amount of five quanta that can be expended during a credit period $T_c$. At the end of the time period $T_c$, the login credits are replenished. FIGS. 3A and 3B illustrate how cumulative login credit can provide an unreliable password validator to an attacker, e.g. an agent, and also a fast reliable validator to the legitimate user, e.g., a person.

FIG. 3A depicts an expenditure of credit by a legitimate user, e.g., a user that has forgotten his or her password. In this example implementation, the time period $T_C$ is selected such that the number of login attempts that are required to deplete the user's credit takes is approximately the amount of time it would take for a person input those attempts. For example, a user that has forgotten his or her password may not immediately try to input another password; he or she may pause to try to remember the password, or retrieve the password if it is written on a paper document, for example. Thus, a user may be reasonably expected to issue five attempts in one minute if he or she has forgotten his or her password, for example.

In FIG. 3A, a credit line 302 illustrates the user's login credit. Just before time $T_o$, the user's account is at full credit. A first invalid login attempt at time $T_c$ starts the monitoring of a credit period $T_c$. The user uses all login credit over a series five attempts, the last attempt being at the time $T_f$. Thereafter, for duration ($T_c$-$T_f$) from the time $T_f$ to the time $T_c$, the user cannot login in. This time period, however, can be a relatively small portion of the time period $T_c$, e.g. 10 seconds, or less, of one minute, depending on how quickly the user attempts to log in. Thereafter, the user's credit is restored. Both before and after credit is depleted, the user receives the same invalid login notification 130.

In FIG. 3B, the credit line 302 illustrates the login credit when the user's identifier is being used by an agent conducting a login attack. In FIG. 3B, the user's credit is quickly depleted, e.g., the time $T_f$ may be less than fraction of one second. Thereafter, for the duration $T_c$-$T_f$ from the time $T_f$ to the time $T_c$, the user cannot login in. This time period, however, is a relatively large portion of the time period $T_c$, e.g., 59 seconds, or more, of one minute, depending on how quickly the agent issues login attacks. For the duration $T_c$-$T_f$ from time $T_f$ to the time $T_c$, the agent cannot log in, regardless of whether correct credentials are provided. Both before and after credit is depleted, the agent receives the same invalid login notification.

As FIGS. 3A and 3B illustrate, the use of cumulative login credit over credit periods provides a relatively reliable login system for a valid user over the credit period, and provides a relatively unreliable login system for an attacker over the same credit period.

Figure 6:
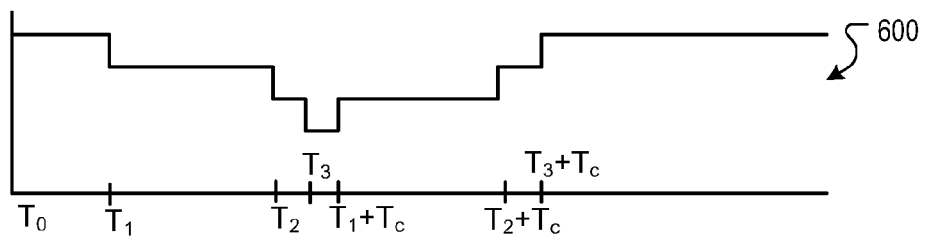

There are many ways in which credit can accumulate after expenditure. FIGS. 4-6 are example login credit accumulation process timelines. The processes of FIGS. 4-6 illustrate examples by which login credit is decremented and incremented, and which can be applied on a portioned basis (e.g., general and reserved login credit). Each of FIGS. 4-6 illustrates an example login credit of five quanta that can be expended during a credit period $T_c$.

The time line 400 of FIG. 4 illustrates a first time period between times 0 and $T_c$ during which a legitimate user provided login credentials resulting in two invalid attempts. The third attempt was a valid login, and as a result the user's login credit was fully restored to a maximum value. At a later time, $T_1$, an automated attack that uses the user's identifier occurs from the time $T_1$ to the time $T_3$. The login credit associated with the user identifier is rapidly depleted by the time $T_2$. The invalid login message conveyed to the attacker before and after the time $T_2$, however, is the same, i.e., a common invalid login notification 130, which presents an unreliable login system to the attacker.

In some implementations, the user's login credit may be fully replenished at the expiration of the time period measured from the first invalid login attempt, i.e., $T_1+T_C$. Note, however, that if the automated attack continues for a duration longer than the credit period $T_c$, then the attacker will be able to have another five login attempts processed. To preclude such processing, another implementation replenishes credit at the expiration of the time period measured from the last invalid login attempt, i.e., $T_3+T_C$.

Instead of fully replenishing login credit at the expiration of a credit time period, login credit can be incremented by a credit quantum, e.g., a unitary value. For example, FIG. 5 illustrates a time line 500 in which user login credit is replenished at the rate of 1 credit per credit time period. Thus, if a user login credit can have a maximum value of five, and the user login credit is completely depleted, then five credit time periods would be required to fully replenish the user login credit.

FIG. 6 illustrates a time line 600 in which user login credit is replenished at the rate of one credit per credit time period referenced from the time of each invalid login attempt, i.e., as described with reference to Table 1 above. For the invalid attempts at times $T_1$, $T_2$ and $T_3$, login credit is decremented; at the times $T_1+T_C$, $T_2+T_C$, and $T_3+T_C$, login credit is incremented.

Other decrementing and replenishment processes can also be used. For example, continued attacks can result in highly negative credit that may require a significant amount of time to replenish.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented login method, comprising:
monitoring a credit time period for a user identifier;
receiving user login credentials at a first time, the user login credentials including the user identifier;
adjusting user login credit associated with the user identifier based on one or more of the user login credentials, the credit time period and the first time;
determining if the user login credit is less than a credit threshold;
allowing login processing of the login credentials if the user login credit is greater than a credit threshold, wherein the login processing generates a common invalid login notification for presentation to a user if a user login credential is invalid; and
denying a login if the user login credit is determined to be less than the credit threshold even if the login credentials are valid, wherein the denial of the login also generates the common invalid login notification for presentation to the user and independent of whether the user login credentials are valid or invalid such that the user is unable to ascertain from the common invalid login notification whether the login credentials were valid or invalid.

2. The method of claim 1, wherein adjusting user login credit associated with the user identifier comprises:
reducing the user login credit if a user login credential is invalid; and incrementing the user login credit if the credit time period has expired.

3. The method of claim 2, wherein incrementing the user login credit comprises incrementing the user login credit by only one incremental quantum if the user login credit is less than a maximum user login credit, wherein the difference between the maximum user credit and the credit threshold comprises a plurality of incremental quanta.

4. The method of claim 2, wherein incrementing the user login credit comprises incrementing the user login credit to a maximum user login credit if the user login credit is less than the maximum user login credit.

5. The method of claim 1, wherein adjusting user login credit associated with the user identifier comprises:
reducing the user login credit if a user login credential is invalid;
incrementing the user login credit if the credit time period referenced from the first time has expired.

6. The method of claim 5, wherein incrementing the user login credit comprises incrementing the user login credit by only one incremental quantum if the user login credit is less than a maximum user login credit, wherein the difference between the maximum user credit and the credit threshold comprises a plurality of incremental quanta.

7. The method of claim 5, wherein incrementing the user login credit comprises incrementing the user login credit to a maximum user login credit if the user login credit is less than the maximum user login credit.

8. The method of claim 1, further comprising:
monitoring login attempts for login credentials including the user identifier; and
adjusting the credit time period based on the monitored login attempts.

9. The method of claim 1, further comprising:
determining if a login attempt rate associated with the user identifier exceeds a rate threshold;
if the login attempt rate is determined to exceed the rate threshold, then precluding login processing of the login credentials for a predetermined time period;
if the login attempt rate is determined to be less than the rate threshold, then:
allowing the login processing of the login credentials; and
adjusting the login attempt rate associated with the user identifier based on the login processing.

10. The method of claim 1, further comprising:
associating a first portion of the user credit with a first login environment;
associating a second portion of the user login credit with a second login environment, the second portion of the user login credit different from the first portion of the user login credit;
determining whether the login credentials are received from the first environment or the second environment; and
processing the first portion of the user login credit or the second portion of the user login credit on a respective first environment basis or a second environment basis based on the determination of whether the login credentials are received from the first environment or the second environment.

11. The method of claim 1, wherein incrementing the user login credit comprises incrementing the user login credit if the credit time period referenced from the first time has expired.

12. The method of claim 1, further comprising:
monitoring login attempts for login credentials including the user identifier; and
adjusting the credit time period based on the monitored login attempts.

13. The method of claim 1, wherein the user login credit comprises a number of times a user may attempt to login over a defined unit of time.

14. The method of claim 13, wherein the user login credit is maintained by a credit processor independent of the user, wherein the user login credit is selected based on an observation that legitimate usually provide correct credentials and the number of times a mistake is made is small, and wherein the user login credit is further selected to enable a relatively slow rate of processing of the login credentials when compared to a brute force attack.

15. A computer-implemented login method, comprising:
monitoring a credit time period for a user identifier;
receiving user login credentials at a first time, the user login credentials including the user identifier;
determining if the user login credit is less than a credit threshold;
allowing login processing of the login credentials if the user login credit is greater than the credit threshold;
decrementing the user login credit associated with the user identifier if the user login credentials are invalid;
precluding login processing if the user login credit is determined to be less than the credit threshold; and
generating a common invalid login notification for presentation to a user such that the user is unable to ascertain from the common invalid login notification whether the login credentials were valid or invalid if:
the login processing is precluded and independent of whether the user login credentials are valid or invalid; or
a user login credential is determined to be invalid during the login processing.

16. The method of claim 15, further comprising incrementing the user login credit if the credit time period has expired.

17. The method of claim 16, wherein incrementing the user login credit comprises incrementing the user login credit by only one incremental quantum if the user login credit is less than a maximum user login credit, wherein the difference between the maximum user credit and the credit threshold comprises a plurality of incremental quanta.

18. The method of claim 16, wherein incrementing the user login credit comprises incrementing the user login credit to a maximum user login credit if the user login credit is less than the maximum user login credit.

19. The method of claim 15, further comprising:
associating a first portion of the user credit with a first login environment;
associating a second portion of the user login credit with a second login environment, the second portion of the user login credit different from the first portion of the user login credit;
determining whether the login credentials are received from the first environment or the second environment; and processing the first portion of the user login credit or the second portion of the user login credit on a respective first environment basis or a second environment basis based on the determination of whether the login credentials are received from the first environment or the second environment.

20. A processing system comprising Software stored in a computer readable medium and executable by the processing system and that upon such execution causes the processing system to perform operations comprising:

monitoring a credit time period for a user identifier;

receiving user login credentials at a first time, the user login credentials including the user identifier;

determining if the user login credit is less than a credit threshold;

allowing login processing of the login credentials if the user login credit is greater than the credit threshold;

decrementing the user login credit associated with the user identifier if the user login credentials are invalid;

precluding login processing if the user login credit is determined to be less than the credit threshold; and generating a common invalid login notification for presentation to a user such that the user is unable to ascertain from the common invalid login notification whether the login credentials were valid or invalid if:

the login processing is precluded and independent of whether the user login credentials are valid or invalid; or a user login credential is determined to be invalid during the login processing.

\* \* \* \* \*